United States Patent
Geisinger (10) Patent No.: US 6,363,962 B1
(45) Date of Patent: Apr. 2, 2002

(54) CRASH VALVE ACTUATOR

(75) Inventor: Penrod C. Geisinger, Humboldt, AZ (US)

(73) Assignee: Vaporless Manufacturing, Inc., Prescott Valley, AZ (US)

(*) Notice: Subject to any disclaimer, the term of this patent is extended or adjusted under 35 U.S.C. 154(b) by 0 days.

(21) Appl. No.: 09/558,526

(22) Filed: Apr. 26, 2000

(51) Int. Cl.$^7$ .......................... F16K 31/12; F16K 31/24
(52) U.S. Cl. ................. 137/312; 137/421; 137/434; 137/75; 137/2; 137/39; 137/41; 141/198; 251/72; 251/74
(58) Field of Search ............... 137/312, 420, 137/421, 39, 2, 38, 41, 44, 68.11, 68.12, 68.16, 75, 434; 251/72, 73, 74; 141/158

(56) References Cited

U.S. PATENT DOCUMENTS

| | | | | |
|---|---|---|---|---|
| 201,979 A | * | 4/1878 | Anderson | 137/421 |
| 921,712 A | * | 5/1909 | Jewell | 137/421 |
| 1,622,069 A | | 3/1927 | Thomson et al. | |
| 1,999,095 A | * | 4/1935 | Gregory | 251/72 |
| 2,952,388 A | | 9/1960 | Deters | 222/52 |
| 2,979,939 A | | 4/1961 | Shuh | 73/40 |
| 3,183,723 A | | 5/1965 | Deters | 73/40.5 |
| 3,236,256 A | | 2/1966 | Valentine | 137/509 |
| 3,454,195 A | | 7/1969 | Deters | 222/52 |
| 3,621,872 A | | 11/1971 | Fisher | 137/494 |
| 3,817,087 A | | 6/1974 | Mooney | 73/40.5 |
| 3,940,020 A | | 2/1976 | McCrory et al. | 222/52 |
| 3,963,041 A | * | 6/1976 | McGillis | 137/421 |
| 4,116,044 A | | 9/1978 | Garrett | 73/40.5 |
| 4,269,061 A | | 5/1981 | Hatsuno et al. | 73/40 |
| 4,410,109 A | | 10/1983 | Murrell, Jr. et al. | 222/52 |
| 4,573,343 A | | 3/1986 | Huiber | 73/40 |
| 4,576,037 A | | 3/1986 | Cox | 73/40.5 |
| 4,679,587 A | | 7/1987 | Jarr | 137/509 |
| 4,966,190 A | | 10/1990 | Geisinger | 137/613 |
| 5,014,543 A | | 5/1991 | Franklin et al. | 73/40.5 |
| 5,033,519 A | * | 7/1991 | Puffer et al. | 141/198 |
| 5,042,290 A | | 8/1991 | Geisinger | 73/40.5 |
| 5,157,958 A | | 10/1992 | Geisinger | 73/3 |
| 5,341,857 A | * | 8/1994 | Bravo | 137/312 |
| 5,682,919 A | * | 11/1997 | DiMaggio | 137/312 |
| 5,713,387 A | * | 2/1998 | Armenia et al. | 137/312 |
| 6,024,116 A | * | 2/2000 | Almberg et al. | 137/312 |

OTHER PUBLICATIONS

Engineering Report entitled "Leak Detector", Revised Jan., 1985.
Engineering Report entitled "The PLD Piston Leak Detector", Feb., 1987.
Document entitled "The PLD 3–Step Leak Test"; Red Jacket Pumps, 5800 Foxridge Dr. Mission, KS 66202.

* cited by examiner

Primary Examiner—George L. Walton
(74) Attorney, Agent, or Firm—Cahill Sutton & Thomas P.L.C.

(57) ABSTRACT

A crash valve is located in a liquid tight dispenser pan at a gasoline service station to close a conduit conveying gasoline to a gasoline dispensing unit to prevent uncontrolled flow of gasoline in the event a vehicle crashes into the dispensing unit. The dispenser pan collects any leaking gasoline or inflow of water; the presence of gasoline is an obvious safety hazard and the accumulating water may cause electrical or mechanical malfunction of the crash valve. An actuator, responsive to the presence of either water or gasoline in the dispenser pan, includes a weighted ball secured to a trip arm of the crash valve by a lanyard. The actuator will respond to the presence of gasoline or water by dislodging the ball and cause the ball to drop. The weight of the falling ball, translated through the lanyard, will cause the trip arm to close the crash valve and prevent further flow of gasoline therethrough and preclude the dispensing unit from pumping gasoline until the trip arm is reset.

26 Claims, 8 Drawing Sheets

CRASH VALVE ACTUATOR

BACKGROUND OF THE INVENTION

1. Field of the Invention

The present invention relates to actuators and, more particularly, to an actuator for a crash valve located beneath a gasoline dispensing unit at a service station.

2. Description of Related Art

As is well known, the gasoline pumped through a dispensing unit at a gasoline service station is highly flammable and presents a very serious potential hazard. From time to time a driver may cause his vehicle to hit the dispensing unit with sufficient force to tilt or dislodge the dispensing unit from its mounting. The conduit conveying gasoline from an underground tank to the dispensing unit will be compromised or severed with a resulting outflow of gasoline. Unless such outflow is immediately checked, the outflow of gasoline will create an inferno if ignited. For this reason, a crash valve is located beneath the dispensing unit and through which the gasoline flows to the dispensing unit. The crash valve is designed to shear upon physical repositioning of the gasoline pump, which shearing automatically closes a valve and terminates further flow through the crash valve and into the dispensing unit. Thus, further flow of gasoline is terminated.

The shear valve is disposed within a sump or a liquid tight dispenser pan beneath the dispensing unit. This pan will collect any gasoline outflow as a result of leakage of gasoline from the crash valve or from any conduits or fittings within the dispensing unit. Additionally, the dispenser pan will collect any water flowing thereinto due to condensation, rain, or cleaning functions.

The presence of gasoline in the dispenser pan is an obvious hazard. The presence of water in the dispensing pan will have a corrosive effect upon both mechanical and electrical components of the crash valve and the apparatus within the dispensing unit due to the resulting humidity and likelihood of periodic condensation. Such corrosion, over a period of time, may compromise the integrity of the gasoline flow path with the obvious resulting safety hazard. Furthermore, the electrical and mechanical control elements attendant gasoline flow may be compromised over a period of time.

Presently, there are no known mechanical actuators responsive to either gasoline or a predetermined quantity of water within the dispenser pan for terminating flow of gasoline through the crash valve.

SUMMARY OF THE INVENTION

The present invention is a mechanical actuator operatively responsive to the presence of either gasoline or water within a dispenser pan located about a crash valve beneath a dispensing unit at a gasoline service station. The presence of gasoline, or any liquid hydrocarbon, will cause elongation of a porous cartridge. The elongation will reposition a plunger that dislodges a weight attached to a pivotable trip arm of the crash valve to terminate flow of gasoline therethrough upon pivotal movement. A float with attached pivoting arm will rise as the water level within the dispenser pan exceeds an acceptable level. The resulting movement of the pivoting arm will dislodge the weight and also result in pivotal movement of the trip arm to terminate flow of gasoline through the crash valve.

It is therefore a primary object of the present invention to provide an actuator for terminating flow through a crash valve in the presence of a liquid hydrocarbon or water.

Another object of the present invention is to provide a completely mechanical actuator responsive to either gasoline or water within a dispenser pan to cause termination of gasoline flow through a crash valve.

Yet another object of the present invention is to provide a simple translatable plunger actuated by an elongating cartridge responsive to the presence of gasoline for dislodging a weight to actuate a trip arm of a crash valve.

A further object of the present invention is to provide a simple float vertically responsive to the presence of water in a dispenser pan for dislodging a weight to actuate a trip arm of a crash valve.

A yet further object of the present invention is to provide an inexpensive mechanical actuator for terminating flow of gasoline through a crash valve upon the presence of gasoline or a predetermined amount of water in a dispenser pan within which the crash valve is located.

A yet further object of the present invention is to provide a method for terminating flow of gasoline through a crash valve upon the presence of gasoline or a predetermined amount of water proximate the crash valve.

These and other objects of the present invention will become apparent to those skilled in the art as the description of invention proceeds.

BRIEF DESCRIPTION OF THE DRAWINGS

The present invention will be described with reference to the following drawings, in which.

DESCRIPTION OF THE PREFERRED EMBODIMENT

Figure 1:
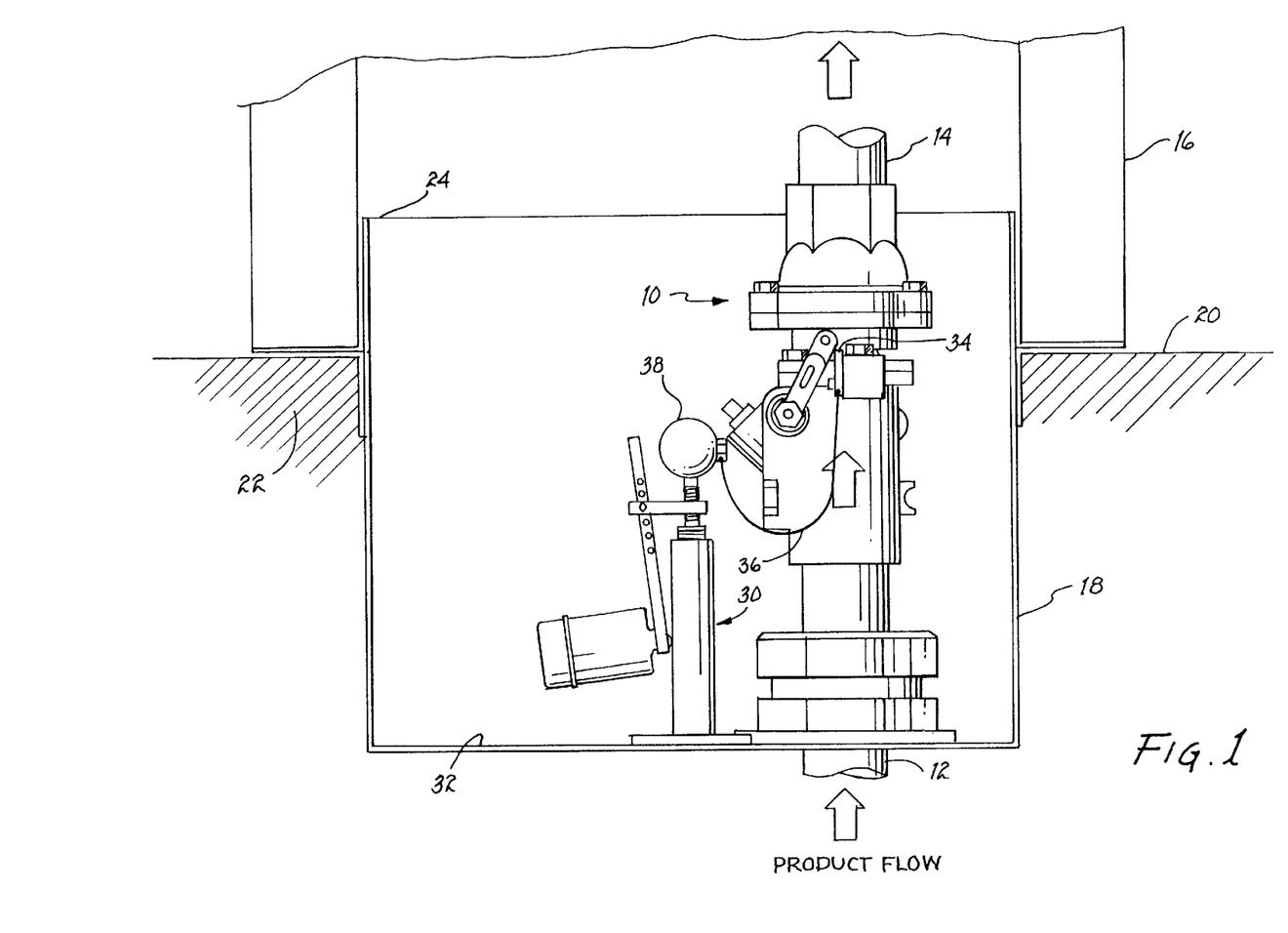
FIG. 1 is an elevational view of the present invention and its environment.

Referring to FIG. 1, there is shown a conventional crash valve 10 connected to an inflow conduit 12 through which gasoline flows from an underground tank or other source of gasoline. An outflow conduit 14 extends from the crash valve into apparatus within gasoline dispensing unit 16, which is of the type found at conventional gasoline service stations. Crash valve 10 is located within a fluid tight dispenser pan located beneath dispensing unit 16 and generally at least partly below grade 20 of the surrounding ground 22. The dispenser pan is located beneath and generally in vertical alignment with the various apparatus attendant dispensing unit 16 for receiving and retaining any gasoline leakage. Necessarily, it will also collect any water that may be present due to condensation, rain, or washing activities attendant the dispensing unit and the adjacent ground. Because upper end 24 of the dispenser pan is above grade 20, water on the ground will generally not flow into the dispenser pan.

An actuator 30 is mounted at bottom 32 of dispensing pan 18 to ensure that it will be responsive to fluid, whether water or gasoline, that may collect in the dispenser pan. The actuator may be freestanding with respect to crash valve 10, as illustrated. A trip arm 34 has been added to the crash valve, which trip arm, upon downward pivotal movement, will cause the crash valve to close and prevent any outflow of gasoline through outflow conduit 14. Actuator 30 is interconnected with the crash valve through a lanyard 36 attached to trip arm 34 and to a weight, which weight may be ball 38, as illustrated. Further details attendant crash valve 10, actuator 30 and their relationship are illustrated in the isometric view shown in FIG. 2.

Figure 3:
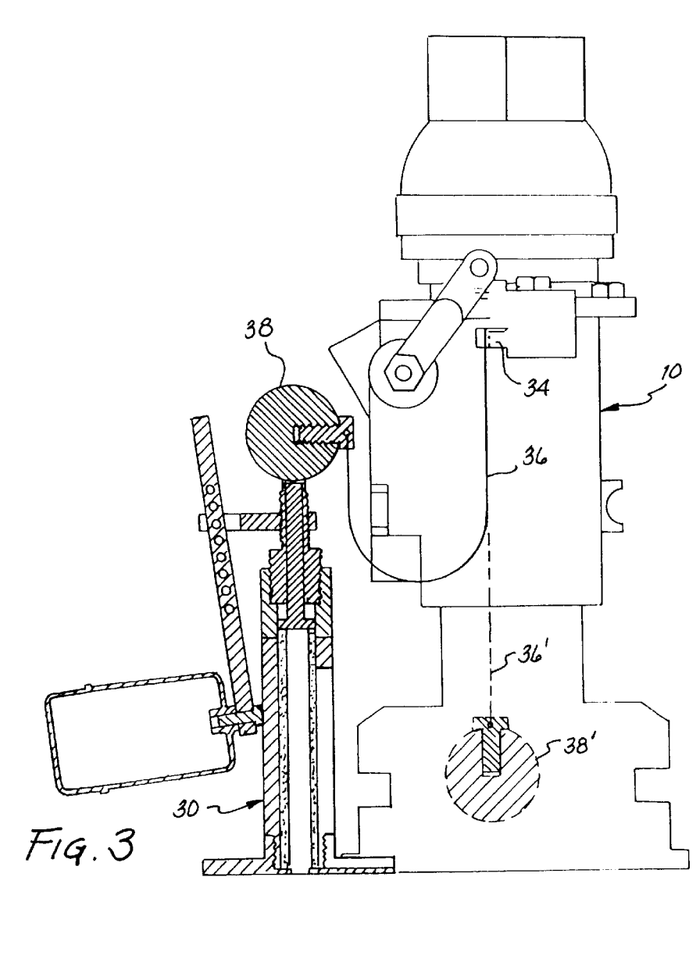
FIG. 3 illustrates a cross-sectional view of the actuator alongside the crash valve.

As shown in FIG. 3, upon dislodging ball 38 from the top of actuator 30, it will drop to a location vertically beneath trip arm 34, as depicted by dashed line 38'. The momentum of the dropping ball, as well as its sheer weight acting through the lanyard (36'), is sufficient to cause pivotal movement of the trip arm in a downward direction. Such downward movement will cause the crash valve to shut off Referring jointly to FIGS. 4 and 5, further details of actuator 30 will be described. Base 40 supports the actuator upon bottom 32 of dispenser 10 (see FIG. 1). Preferably, the base is of brass or other non-magnetically responsive material and includes one or more cavities, of which cavities 42, 44 are shown, for supporting magnets 46, 48. Alternatively, the magnet(s) may be located in a hole(s) extending through the base. The magnets cooperate with the magnetically responsive material (such as steel) of bottom 32 of the dispenser pan to retain actuator 30 in position relative to crash valve 10. Thereby, the actuator is readily replaceable or readily mountable in existing dispenser pans. For a more permanent installation, bolts, screws, epoxy, mastic or other attachment means may be used to secure the base to the dispenser pan. A sleeve 50 may be threadedly engaged with a hollow boss 52 extending upwardly from the base. The sleeve includes a vertical slot 54 to provide a passageway into interior cylinder 56 of the sleeve. An extension slot 55 may be formed in base 40. Furthermore, a hole 57 in fluid communication with cylinder 56 may be formed in the base. Upper end 58 of sleeve 50 includes interiorly formed threads 60 for threadedly engaging a hollow plug 62. It is to be noted that upper end 58 may be a separate part attached to sleeve 50 by any means well-known to those skilled in the art; alternatively, the upper end may be formed as part of the sleeve if manufacturing economics so permit. Plug 62 includes a hollow cylindrical channel 64. Necked down section 66 of the plug may be threaded, as illustrated. A porous hydrophobic cartridge 70 is mounted in cylinder 66 of sleeve 50. This cartridge supports a disk shaped base 72 of a plunger 74 slidably mounted within channel 64.

In the quiescent state of actuator 30 when neither water nor gasoline (liquid hydrocarbon) is present within dispenser pan 18, end 76 of plunger 74 is below annular end 78 of necked down section 66. A weight, such as ball 38, rests upon the annular end. A bolt 80 is in threaded engagement with a threaded cavity 82 in the ball. Upon threaded engagement, the bolt will extend outwardly from the ball and cause the center of gravity of the ball to be off-center toward the bolt as a function of the degree of imbalance created by the weight of the bolt and its extension from the ball. The bolt includes a hole or passageway 84 in the head of the bolt for attaching lanyard 36 (See FIG. 3).

A bracket 90 may be in threaded engagement with neck down section 66 and extends laterally therefrom. The bracket pivotally supports an arm 92 at pivot point 94. By including a plurality of apertures 96 along arm 92, the pivot point of the arm may be adjusted as necessary. Lower end 98 of the arm supports a float 100.

Figure 4:
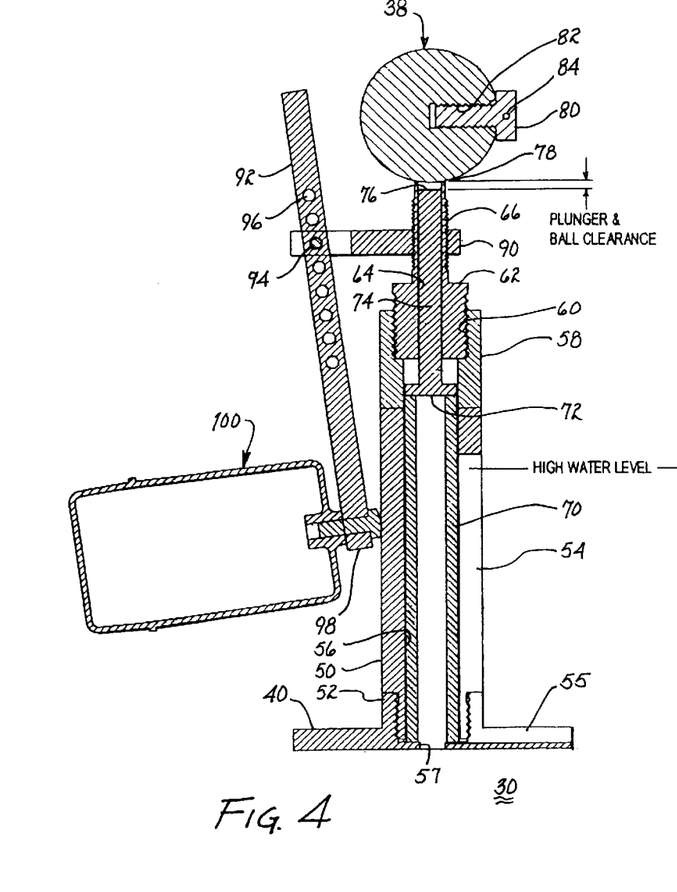
FIG. 4 is a detailed cross-sectional view of the actuator.
Figure 5:
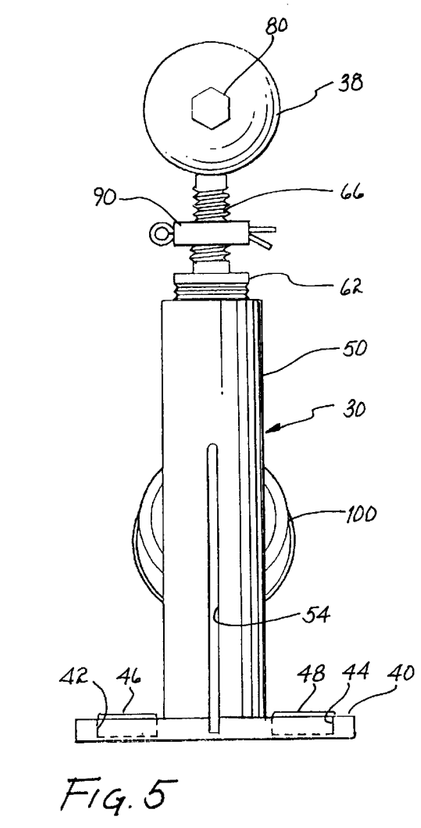
FIG. 5 is a side view of the actuator.
Figure 6:
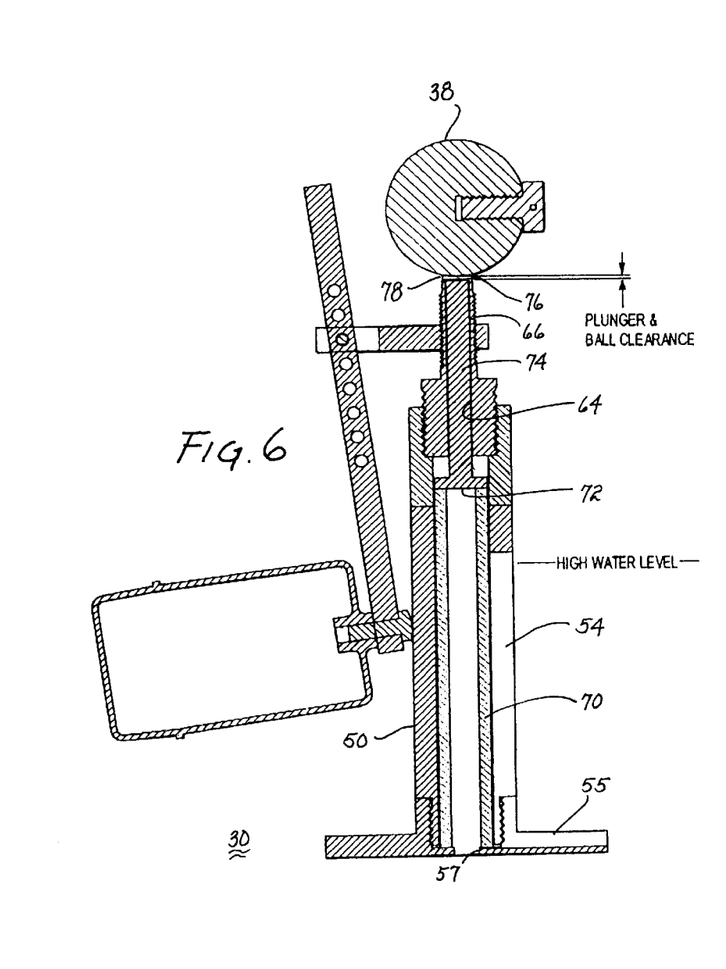
FIG. 6 is a cross-sectional view of the actuator showing its reaction to the presence of a hydrocarbon vapor.
Figure 7:
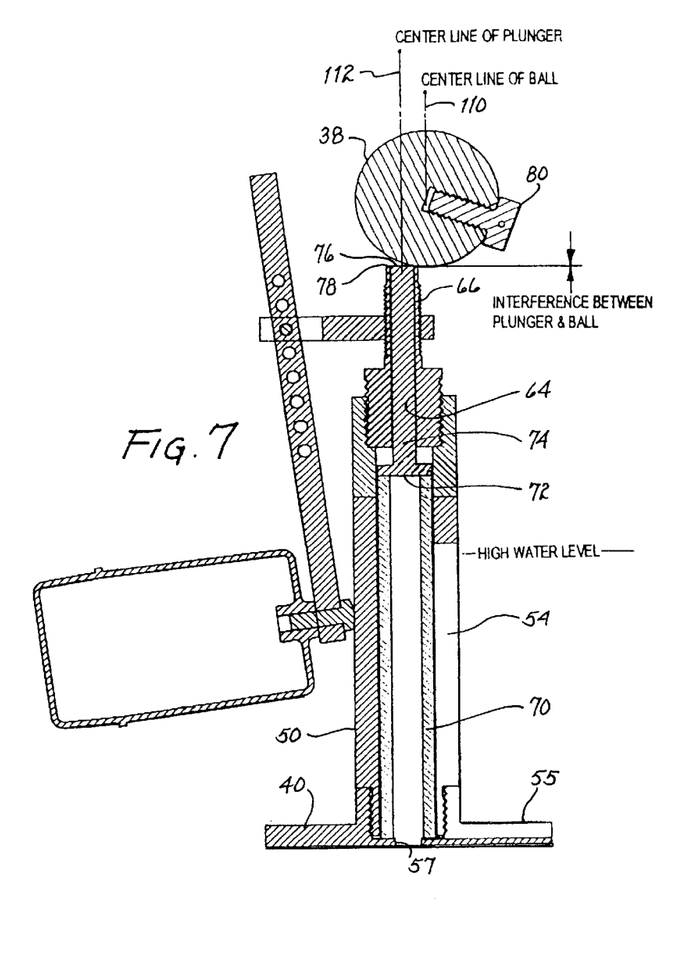
FIG. 7 is a cross-sectional view of the actuator illustrating its response to the presence of a liquid hydrocarbon.

The operation of actuator 30 in response to the presence of hydrocarbon vapor or liquid hydrocarbon within the dispenser pan 18 will be described with joint reference to FIGS. 6 and 7. Upon permeation of either a hydrocarbon vapor or liquid hydrocarbon into porous hydrophobic cartridge 60, the cartridge will elongate. A cartridge suitable for this purpose is Part No. 5361 manufactured by Porex Porous Plastics of Fairburn, Ga. The degree of elongation is primarily a function of the amount of liquid hydrocarbon permeating therewithin. Often, and as part of the natural course of operation of a dispensing unit 16, a degree of hydrocarbon vapor will be present within the dispenser pan and permeate the porous hydrophobic cartridge. Such permeation will cause a slight elongation of the cartridge, as shown in FIG. 6. Typically, the elongation due to permeation of a hydrocarbon vapor is about one half (½) of the elongation due to permeation of a liquid hydrocarbon. Specifically, in the quiescent state the space between annular end 78 and end 76 of plunger 74 is of a certain dimension, as shown in FIG. 4. As porous hydrophobic cartridge 70 elongates in the presence of a hydrocarbon vapor, as shown in FIG. 6, such elongation will translate plunger 74 upwardly through channel 64. By selecting the space between annular end 78 and end 76 of plunger 74 to be a sufficient amount, as shown in FIG. 4, the elongation of the porous hydrophobic cartridge due to permeation of hydrocarbon vapor is insufficient to cause end 76 of the plunger to extend past annular end 78. Accordingly, no contact between end 76 of the plunger and ball 38 will occur in the presence of a hydrocarbon vapor within the dispenser pan 18.

If a liquid hydrocarbon, such as gasoline, leaks from dispensing unit 16, crash valve 10 or from another source into dispenser pan 18, the gasoline will flow through slot 55 and hole 57 in base 40 and through slot 54 in sleeve 50 into contact with porous hydrophobic cartridge 70. Upon such contact, the gasoline will wick throughout the porous hydrophobic cartridge and cause elongation of the cartridge very rapidly. The elongation of the cartridge will act upon base 72 of plunger 74 and result in upward travel of the plunger as a function of the degree of elongation. By appropriate dimensioning of the components, the upward travel of plunger 74 will be sufficient to cause end 76 of the plunger to extend above annular end 78 of neck down section 66, as shown in FIG. 7. As described above, bolt 80 offsets the center of gravity (represented by reference numeral 110) of ball 38 in the direction of the bolt. Thus, in the quiescent state (as shown in FIG. 4), the center of gravity (110) of the ball is offset from the center line (represented by reference numeral 112) of plunger 74 toward the bolt. As end 76 of the plunger comes into contact with ball 38 due to elongation of the porous hydrophobic cartridge, the center of gravity of the ball, being offset of center line 112 of the plunger, will cause the ball to roll in the direction of the bolt 80. Such rolling will continue until the ball falls free of actuator 30. The resulting drop of the ball (see ball 38' in FIG. 3) will result in drawing down lanyard 38 until the lanyard becomes vertical (see lanyard 36' in FIG. 3). The downward movement of the ball being arrested by the lanyard results in a downward jerk upon trip arm 34. This jerk will cause the trip arm to pivot downwardly and result in shut off flow of gasoline through crash valve 10.

Figure 8:
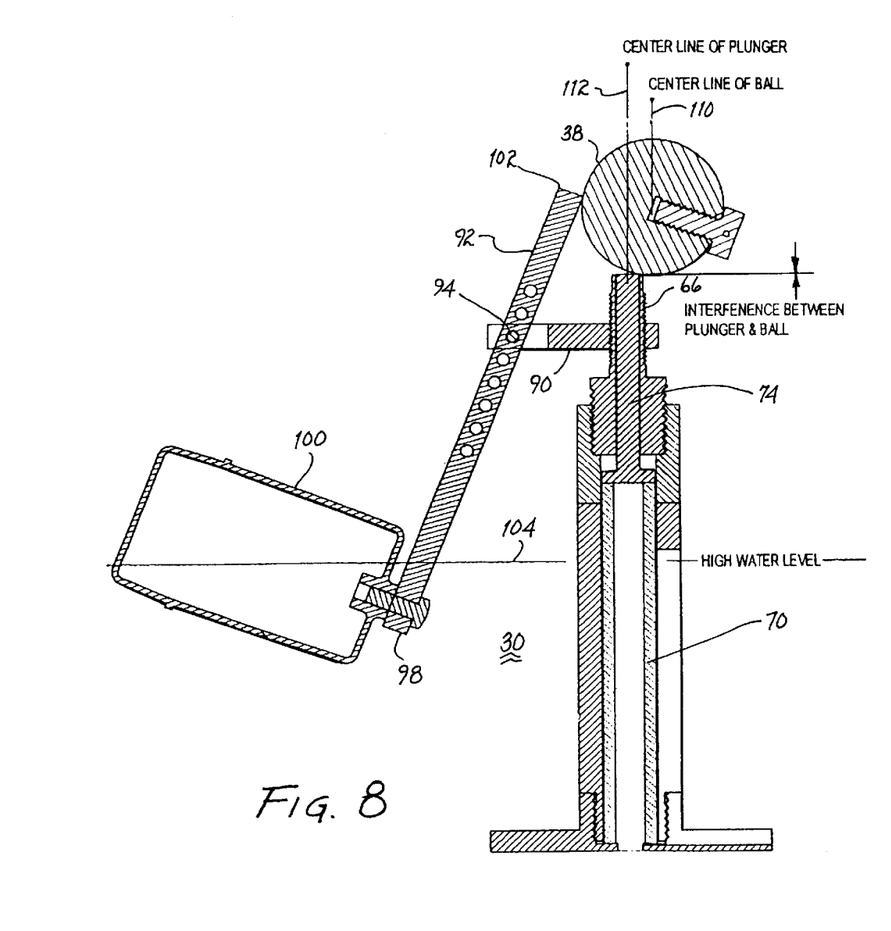
FIG. 8 is a cross-sectional view of the actuator illustrating its response to the presence of a high water level.

Referring to FIG. 8, the operation of actuator 30 will be described when water seeps or flows into dispenser pan 18. Porous hydrophobic cartridge 70 is non-responsive to the presence of water and therefore will not elongate. Thus, the position of plunger 74 remains steady. As the water level within dispenser pan 18 rises, float 100 will rise due to its buoyancy. The rising float will cause arm 92 to pivot about pivot point 94 of bracket 90. As the pivot arm pivots, upper end 102, or a portion thereof, will come into contact with and bear against ball 38. When the water level rises to a predetermined level, as depicted by numeral 104, float 100 will have risen sufficiently to cause end 102 to push ball 38 off center line 112. The resulting repositioning of the center of gravity (110) of the ball will cause it to roll on its own off annular end 72. Thereafter, the ball will drop and result in actuation of trip arm 34, as described above.

The high water level 104 sufficient to raise float 100 to cause ball 33 to roll off annular end 78 must be below the top end of porous hydrophobic cartridge 70 for the following reason. The porous hydrophobic cartridge is impermeable to water. If there is some water in dispenser pan 18 and a liquid hydrocarbon (gasoline) subsequently flows into the dispenser pan, it will float on top of the water as it is less dense than water. Ultimately, the liquid hydrocarbon will migrate into contact with the porous hydrophobic cartridge. Upon such contact, the liquid hydrocarbon will permeate throughout the porous hydrophobic cartridge due to its wicking action and elongation will result. With such elongation, plunger 74 will be translated upwardly and ball 38 will become dislodged, as described above. If the high water level (104) were above the top of the porous hydrophobic cartridge, any liquid hydrocarbon then present would not cause the actuator to be actuated due to the presence of any liquid hydrocarbon.

In some parts of the country, earthquakes occur from time to time. Such earthquakes can and do cause leaks of gasoline from burst or damaged gasoline conveying conduits. Ball 38 of actuator 30 requires a very small disturbing force to cause it to roll off annular end 78. The shaking of the ground due to an earthquake is enough to cause the ball to topple. Thus, upon occurrence of an earthquake actuator 30 will close crash valve 10 and further flow of gasoline therethrough will cease.

Figure 9:
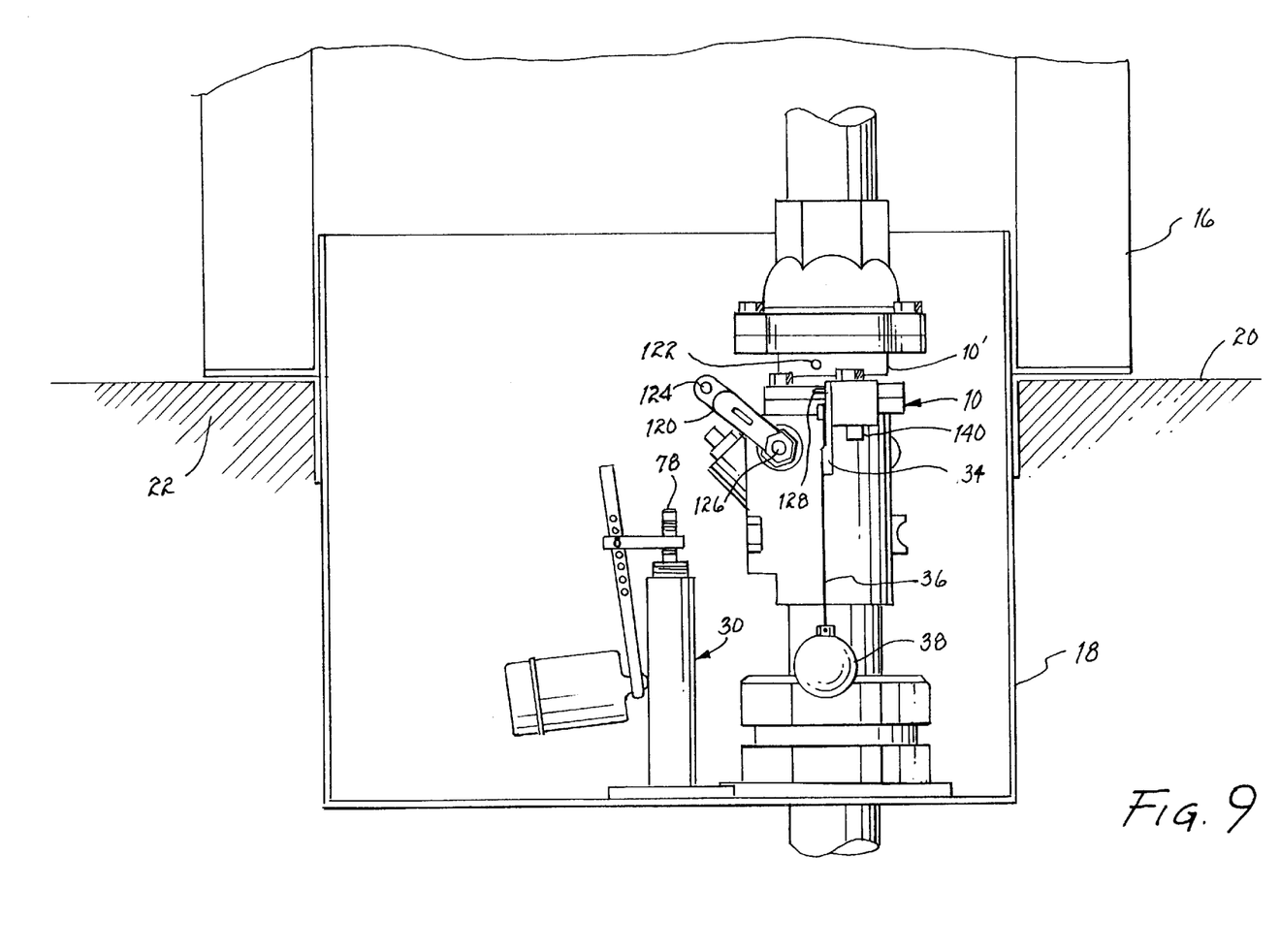
FIG. 9 illustrates the actuator and crash valve after the actuator has been actuated.

As shown in FIG. 9, in the presence of gasoline or a liquid hydrocarbon (gasoline) within the dispenser pan 18, ball 38 will have been caused to become dislodged off annular end 72 of actuator 30. The resulting position of the ball will be essentially below the engaged point of trip arm 34. The momentum and weight of the ball will have caused the trip arm to pivot downwardly, as illustrated.

Figure 2:
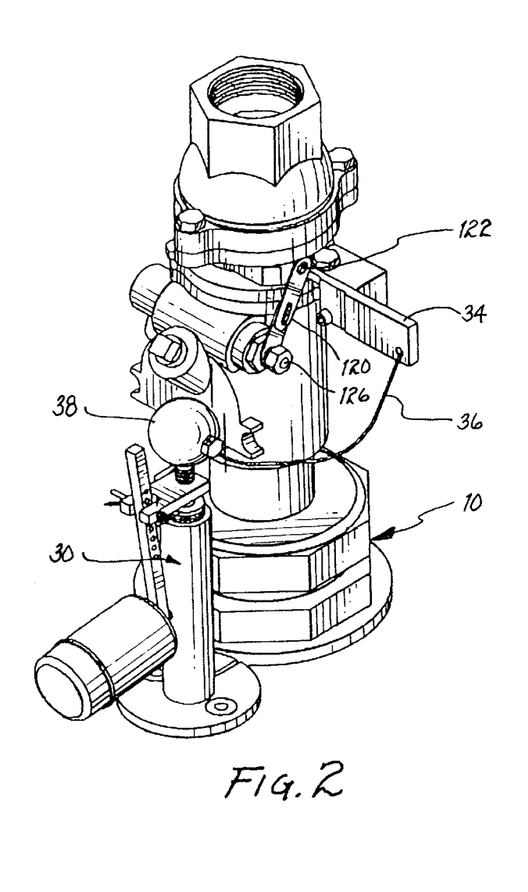
FIG. 2 is an isometric view of a crash valve and an actuator for terminating flow through the crash valve.

Referring jointly to FIGS. 2 and 9, operation of crash valve 10 upon pivotal movement of trip arm 34 will be described. A fusible link 120 is biased to the counterclockwise position shown in FIG. 9 and in this position mechanisms internal to crash valve 10 will shut off further flow of gasoline through the crash valve. The fusible link is retained in its clockwise position shown in FIG. 3 by a pin 122 extending from the upper body 10' engaging an aperture 124 at the end of the fusible link. The attachment of the fusible link allows it to pivot in a plane extending through its connecting shaft 126 but not about the shaft. Trip arm 34 includes a rod 128 extending therefrom. To cock the trip arm, it is raised to the position shown in FIG. 2 which places rod 128 behind fusible link 120 when it is in engagement with pin 122. Upon downward pivotal movement of trip arm 34, rod 128 bears against the back side of the fusible link and pulls it off pin 122 to release it from the pin. Thereafter, the fusible link is free to pivot counterclockwise to the position shown in FIG. 9.

Figure 10:
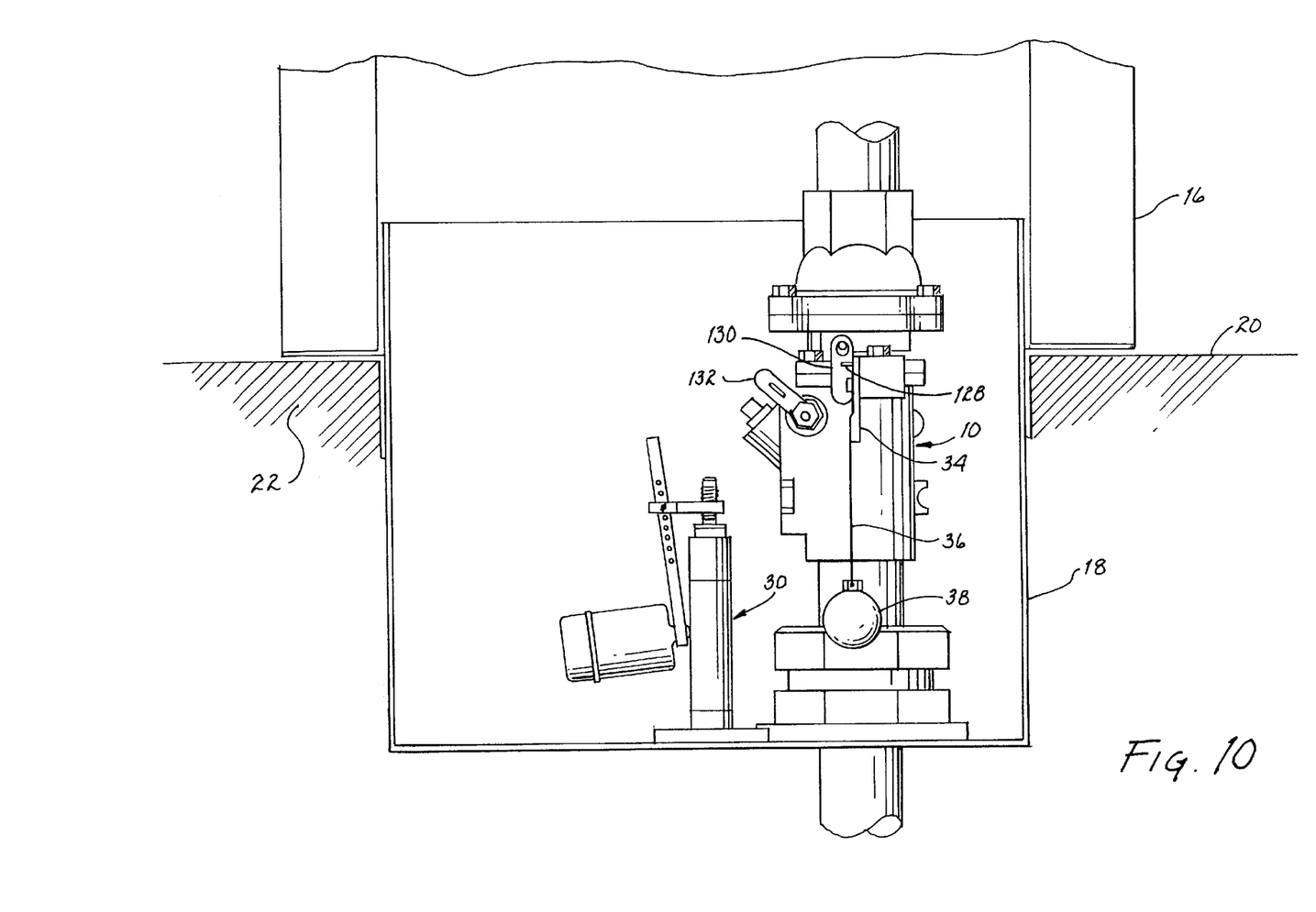
FIG. 10 illustrates the actuator and crash valve after a fusible link of the crash valve has been severed.

As shown in FIG. 10, fusible link 120 includes two links 130, 132 normally in engagement with one another to thereby work in concert. Solder or similar low melt temperature material secures the links to one another. In the presence of fire or other heat source, the solder will melt and the links will separate, as shown. Upon such separation link 132 will pivot counterclockwise and further flow through crash valve 10 will terminate.

Figure 11:
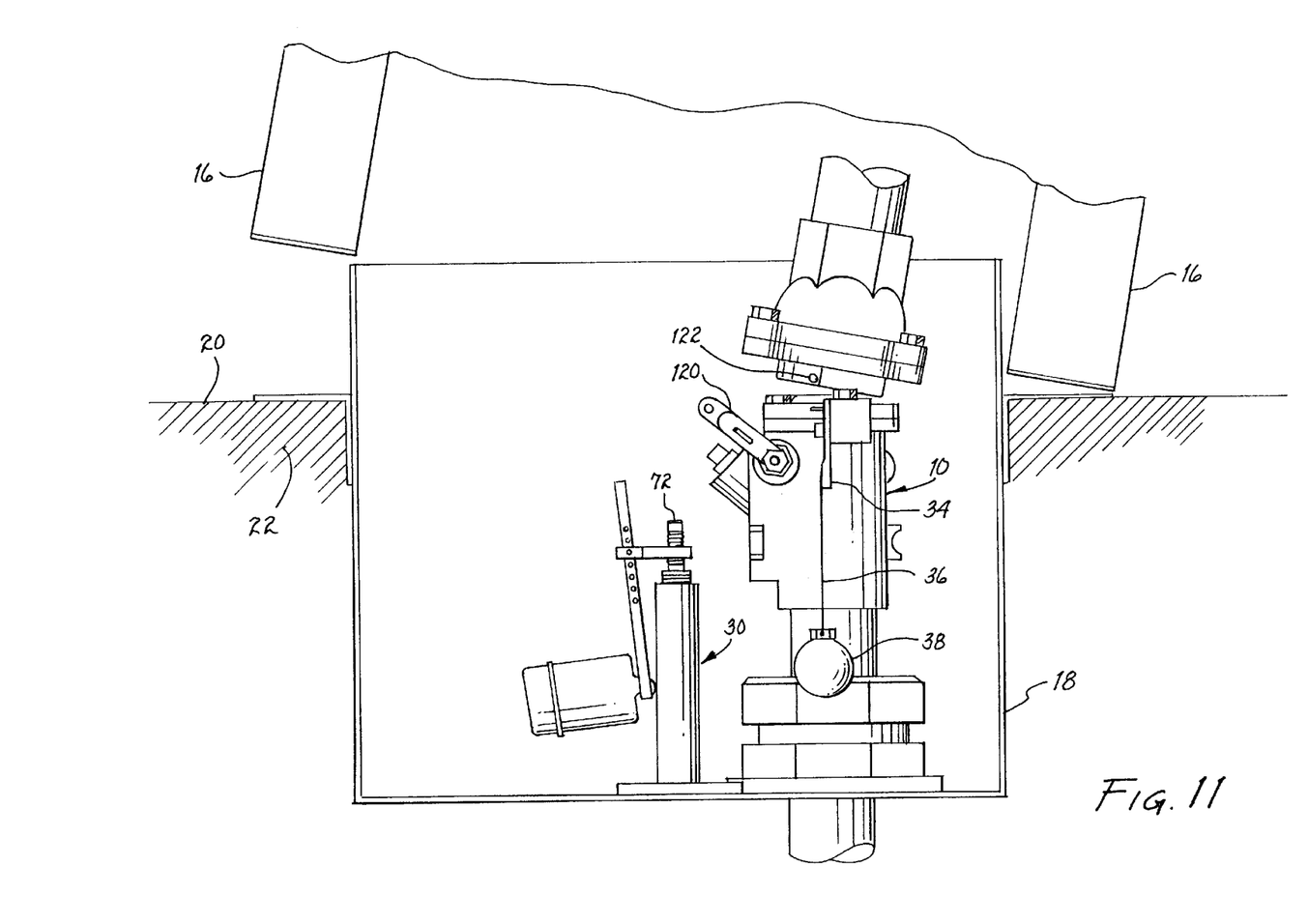
FIG. 11 illustrates shearing of the crash valve upon repositioning of an associated gasoline dispensing unit.

FIG. 11 primarily illustrates the designed shearing of crash valve 10 as a result of displacement of dispensing unit 16 due to impact from a vehicle or the like. The resulting jostling of actuator 30 will also result in movement of ball 38 off annular end 72 of actuator 30 and result in downward pivotal movement of trip arm 34. Simultaneously, fusible link 120 will be released from pin 122 to permit movement to its biased position and shut off further flow of gasoline through crash valve 10.

It is to be appreciated that the sensitivity for dislodging ball 38 off annular end 78 is a function of the diameter of the annular end (and the diameter of the circumscribed plunger end 76) and the diameter (degree of curvature of ball 38). Thus, the larger the ratio of the diameter of the ball to the diameter of the annular end, the more sensitive is the actuator to a force attempting to dislodge the ball from the annular end.

It is to be understood that switch means 140 may be associated with the fusible link trip arm 34 (as shown in FIG. 11) to provide an electrical signal for use at a remote location to determine the on or off state of the crash valve and/or the armed or unarmed state of actuator 30.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

I claim:

1. An actuator for actuating a crash valve located in a dispenser pan and operating in conjunction with a dispensing unit for dispensing gasoline at a service station, said actuator comprising in combination:
   a) a base for locating said actuator in the dispenser pan;
   b) a sleeve defining a hollow cylinder and extending upwardly from said base and including a slot in fluid communication with said cylinder and an annular end located at the upper end;
   c) a ball seated upon said annular end;
   d) a porous hydrophobic cartridge disposed within said cylinder, said cartridge becoming elongated in response to contact with a liquid hydrocarbon;
   e) a plunger translatable within said sleeve in response to elongation of said porous hydrophobic cartridge and having an end translatable past said annular end of said sleeve to dislodge said ball from said annular end;
   f) a trip arm pivotably attached to the crash valve for initiating closure of the crash valve upon pivotal movement of said trip arm;

g) a lanyard interconnecting said ball with said trip arm;

h) a float vertically responsive to any water present in the dispenser pan;

i) a pivotable arm having one end attached to said float and the other end proximate said ball for dislodging said ball from said annular end upon a rise of said float when the water within the dispenser pan reaches a predetermined level;

whereby, upon dislodgement of said ball, said ball will drop until restrained by said lanyard and the force of said ball on said lanyard will pivot said trip arm and the crash valve will close.

2. The actuator as set forth in claim 1 including at least one magnet for securing said base to the dispenser pan.

3. The actuator as set forth in claim 1 wherein said base includes a slot in fluid communication with said cylinder.

4. The actuator as set forth in claim 3 wherein said base includes a hole in axial alignment with said cylinder.

5. The actuator as set forth in claim 1 including a bracket supported by said sleeve, said bracket including means for pivoting said pivotable arm.

6. An actuator for activating a trip arm in response to the presence of a liquid hydrocarbon or a rise in water level to a predetermined level, said actuator comprising in combination:

a) a weight supported by said actuator, said weight including a lanyard interconnecting said weight with a trip arm for actuating said trip arm when said weight is dislodged from said actuator and drops;

b) an element elongatable in response to the presence of a liquid hydrocarbon;

c) means responsive to elongation of said element for dislodging said weight; and d) an arm positionally responsive to the water level for urging dislodgement of said weight when the predetermined water level occurs.

7. The actuator as set forth in claim 6 wherein said weight is a ball.

8. The actuator as set forth in claim 7 wherein the center of gravity of said ball is off center to encourage dislodgement of said ball in response to a force acting thereon.

9. The actuator as set forth in claim 6 wherein said element is a porous hydrophobic cartridge.

10. The actuator as set forth in claim 9 wherein said actuator includes a cylinder for housing said cartridge and wherein said dislodging means comprises a plunger translatably responsive to elongation of said cartridge.

11. The actuator as set forth in claim 10 wherein said weight is a ball.

12. The actuator as set forth in claim 11 including an annular end for supporting said ball and wherein an end of said plunger translates past said annular end to dislodge said ball.

13. The actuator as set forth in claim 6 including a float vertically responsive to the presence of water for reorienting said arm as a function of the vertical position of said float.

14. The actuator as set forth in claim 13 including a bracket supported by said actuator for pivotally mounting said arm.

15. The actuator as set forth in claim 14 wherein one end of said arm is secured to said float and a section of the other end of said arm contacts said weight to bring about dislodgement of said weight.

16. The actuator as set forth in claim 15 wherein said weight is a ball.

17. A method for actuating a trip arm associated with a crash valve to terminate flow of gasoline through the crash valve, said method comprising the steps of:

a) supporting a weight at an elevated location, which weight includes a lanyard interconnecting the weight with the trip arm to actuate the trip arm when the weight is dislodged from its elevated location and drops;

b) dislodging the weight from its elevated location in response to elongation of an element in the presence of a liquid hydrocarbon;

c) alternatively dislodging the weight from its elevated location in response to a rise of water to a predetermined level; and d) further alternatively dislodging the weight from its elevated location in response to movement of the elevated location.

18. The method as set forth in claim 17 wherein the weight is a ball and wherein each of said steps of dislodging, alternatively dislodging, further alternatively dislodging includes the step of rolling the ball.

19. A method for actuating a trip arm associated with a crash valve to terminate flow of gasoline through the crash valve, said method comprising the steps of:

a) supporting a weight at an elevated location, which weight includes a lanyard interconnecting the weight with the trip arm to actuate the trip arm when the weight is dislodged from its elevated location and drops; and b) dislodging the weight from its elevated location in response to elongation of an element in the presence of a liquid hydrocarbon.

20. The method as set forth in claim 19 wherein the weight is a ball and wherein said step of dislodging includes the step of rolling the ball.

21. A method for actuating a trip arm associated with a crash valve to terminate flow of gasoline through the crash valve, said method comprising the steps of:

a) supporting a weight upon an actuator at an elevated location, which weight includes a lanyard interconnecting the weight with the trip arm to actuate the trip arm when the weight is dislodged from its elevated location and drops; and b) dislodging the weight from its elevated location upon the actuator in response to a rise of water to a predetermined level.

22. The method as set forth in claim 21 wherein the weight is a ball and wherein said step of dislodging includes the step of rolling the ball off the actuator.

23. A method for actuating a trip arm associated with a crash valve to terminate flow of gasoline through the crash valve, said method comprising the steps of:

a) supporting a weight upon an actuator at an elevated location, which weight includes a lanyard interconnecting the weight with the trip arm to actuate the trip arm when the weight is dislodged from its elevated location and drops; and b) dislodging the weight from its elevated location upon the actuator in response to movement of the elevated location.

24. The method as set forth in claim 23 wherein the weight is a ball and wherein said step of dislodging includes the step of rolling the ball off the actuator.

25. An actuator for activating a trip arm in response to the presence of a liquid hydrocarbon or a rise in water level to a predetermined level, said actuator comprising in combination:

a) a weight supported by said actuator, said weight including a lanyard interconnecting said weight with a trip arm for actuating said trip arm when said weight is dislodged from said actuator and drops;

b) an element elongatable in response to the presence of a liquid hydrocarbon; and c) means responsive to elongation of said element for dislodging said weight from said actuator.

26. An actuator for activating a trip arm in response to the presence of a liquid hydrocarbon or a rise in water level to a predetermined level, said actuator comprising in combination:

a) a weight supported by said actuator, said weight including a lanyard interconnecting said weight with a trip arm for actuating said trip arm when said weight is dislodged from said actuator and drops; and b) an arm positionally responsive to the water level for urging dislodgement of said weight from said actuator when the predetermined water level occurs.

* * * * *